United States Patent Office 3,383,392
Patented May 14, 1968

---

3,383,392
PROCESS FOR MAKING 2-AMINOMETHYL-3,4-DI-HYDRO-2H-PYRAN FROM 2-FORMYL-3,4-DIHY-DRO-2H-PYRAN, HYDROGEN AND AMMONIA IN THE PRESENCE OF METALLIC COBALT OR NICKEL
Frank Clifford Mawer, Manchester, England, assignor to Imperial Chemical Industries Limited, London, England, a corporation of Great Britain
No Drawing. Continuation-in-part of application Ser. No. 427,943, Jan. 25, 1965. This application Dec. 30, 1966, Ser. No. 606,008
Claims priority, application Great Britain, Jan. 29, 1964, 3,821/64; July 15, 1964, 29,113/64; July 23, 1964, 29,659/64; Jan. 15, 1965, 1,913/65
6 Claims. (Cl. 260—345.1)

ABSTRACT OF THE DISCLOSURE

A process for producing organic amines containing a 3,4-dihydro-2H-pyran ring by reacting an aldehyde of the formula

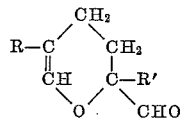

wherein R and R' represent hydrogen or alkyl radicals with hydrogen. The reaction is carried out in the presence of ammonia, a primary or a secondary amine and also in the presence of a metallic cobalt or nickel catalyst which has been produced by the reduction of the corresponding metal oxide.

---

This application is a continuation-in-part of application Ser. No. 427,943, filed Jan. 25, 1963, now abandoned.

This invention relates to a process for the manufacture of organic amines in particular to a process for the manufacture of organic amines containing a 3,4-dihydro-2H-pyran ring.

Thus according to the present invention there is provided a process for the manufacture of 2-aminoethyl-3,4-dihydro-2H-pyrans and substituted derivatives thereof which comprises reacting an aldehyde of the general Formula I—

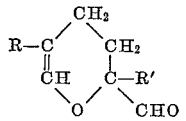   I wherein R and R' represent hydrogen or alkyl radicals, with hydrogen in the presence of ammonia or a primary or secondary amine and in the presence as catalyst of metallic cobalt or nickel produced by reducing the corresponding metallic oxide.

The present process may be described as aminative reduction of the formyl compound or aldehyde of the general Formula I. In the presence of the catalysts of the present invention it has been found that reductive amination of the formyl or aldehyde group can be accomplished without saturation of the double bond in the pyran ring.

The aldehydes used as starting materials for the present process are 2-formyl-3,4-dihydro-2H-pyran or derivatives thereof having alkyl substituents in the 2- and/or 5-positions of the dihydropyran ring. Thus there may be used as starting materials in the present process, compounds having the general Formula I given above wherein both R and R' represent hydrogen atoms, compounds wherein both R and R' represent alkyl radicals and compounds wherein R or R' represents hydrogen and the other member of the pair R and R' represents an alkyl group.

Examples of alkyl groups represented by R and/or R' in the formula above include methyl, ethyl, propyl, butyl and hexyl.

Thus, examples of suitable starting materials for the present process include 2-formyl-3,4-dihydro-2H-pyran commonly known as acrolein dimer, 2-formyl-2,5-dimethyl-3,4-dihydro-2H-pyran commonly known as methacrolein dimer, the 2,5-diethyl, 2,5-dipropyl and 2,5-dibutyl homologues of the latter compound, and 2-formyl-2-methyl-3,4-dihydro-2H-pyran.

The process is found particularly applicable when the starting material is 2-formyl-3,4-dihydro-2H-pyran or derivatives thereof in which the alkyl groups represented by R and R' in the general Formula I above are alkyl groups having from 1 to 4 carbon atoms.

The process of the present invention is carried out in the presence of ammonia or a primary or secondary amine.

When ammonia is used in the present process the product of the process is a primary amine of the general formula—

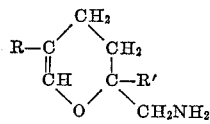

Thus examples of the products of the present process which are obtained when ammonia is used in the process include, 2-aminomethyl-3,4-dihydro-2H-pyran, 2-aminomethyl-2,5-dimethyl-3,4-dihydro-2H-pyran, the 2,5-diethyl, 2,5-dipropyl and 2,5-dibutyl homologues of the latter compound and 2-aminomethyl-2-methyl-3,4-dihydro-2H-pyran.

When an amine is used in the present process any secondary or primary amine may be used.

Thus examples of primary or secondary amines which can be used in the present process include primary amines of the general formula $XNH_2$, secondary amines of the general formula

and secondary amines of the general formula

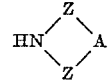

where X and Y represent hydrocarbon or substituted hydrocarbon radicals, Z represents a bivalent alkylene group and A represents oxygen, the $CH_2$ radical, the radical N—X or an ortho-phenylene radical.

X and Y may represent any hydrocarbon radical such as an alkyl, aryl, aralkyl or cycloalkyl radical which radical may optionally be substituted. Substituents which may be present in such hydrocarbon radicals include hydroxy, alkoxy and amino groups. The alkylene group represented by Z may be for example the methylene or ethylene group. A may represent oxygen, the $CH_2$ radical, the radical N—X or the orthophenylene radical

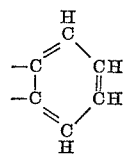

Examples of the group

thus include—

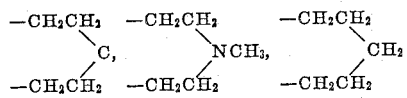

and

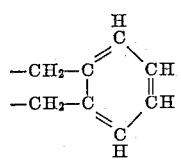

When the secondary amine is of the formula

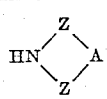

it is preferred that the atoms or radicals represented by Z and A should be such as to form a 5- or 6-membered ring with the nitrogen atom.

Radicals which may be represented by X or Y include alkyl radicals such as methyl, ethyl, propyl, isopropyl, n-butyl, isobutyl, tert-butyl, octyl, 2-ethylhexyl, nonyl, decyl, dodecyl and octadecyl, cycloalkyl radicals such as cyclohexyl and methyl cyclohexyl, aryl radicals such as phenyl, tolyl, xylyl and para-ethylphenyl, aralkyl radicals such as benzyl and phenyl ethyl and substituted hydrocarbon radicals such as hydroxy alkyl, alkoxy alkyl, alkoxy aryl, aminoalkyl and aminoaryl radicals.

Thus examples of primary amines which may be used in the present process include methylamine, allylamine, ethylamine, propylamine, isopropylamine, n-butylamine, octylamine, decylamine, hexadecylamine, monoethanolamine, cyclohexylamine, aniline, ortho, meta- or para-toluidines, the xylidines, para-ethylaniline, para-butylaniline, α- and β-naphthylamine, benzylamine, phenylethylamine, ethylene diamine, hexamethylene diamine and the phenylene diamines.

Examples of secondary amines of the formula

which may be used in the present process include dimethylamine, diethylamine, dipropylamine, di-n-butylamine, methylethylamine, N-methylethanolamine, diethanolamine, N-methylaniline, N-ethylaniline, N-methyl-o-toluidine, N-methyl-p-toluidine, N-methyl-m-toluidine, N-ethyl-o-toluidine, N-butylaniline, p-anisidine, diphenylamine, N,N' - dicyclohexylamine, N - methylcyclohexylamine and N-methylbenzylamine.

Examples of secondary amines of the formula

which may be used in the present process include piperidine pyrrolidine, morpholine, iso-indoline and N-methylpiperazine.

When a primary amine is used in the present process the product is of the general formula—

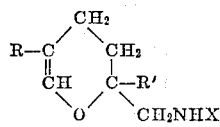

When a secondary amine of the general

is used in the present process the product of the general formula—

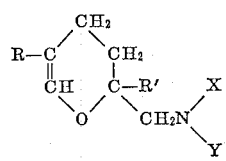

When a secondary amine of the general formula

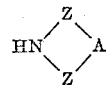

is used in the present process the product is of the general formula—

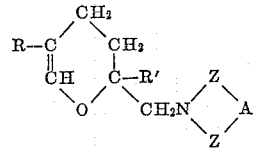

In the above 3 general formulae R, R', X, Y, Z and A are as hereinbefore defined.

Thus such products of the present process are novel dihydropyranyl compounds containing a secondary or tertiary amino group. Illustrative examples of the novel products of the present process include—

2-N-methylaminomethyl-3,4-dihydro-2H-pyran
2-N-ethylaminomethyl-3,4-dihydro-2H-pyran
2-N-butylaminomethyl-3,4-dihydro-2H-pyran
2-N-phenylaminomethyl-3,4-dihydro-2H-pyran
2-N-hexadecylaminomethyl-3,4-dihydro-2H-pyran
2-N-cyclohexylaminomethyl-3,4-dihydro-2H-pyran
2-N-benzylaminomethyl-3,4-dihydro-2H-pyran
2-N-methylaminomethyl-2,5-dimethyl-3,4-dihydro-
    2H-pyran
2-N,N-dimethylaminomethyl-3,4-dihydro-2H-pyran
2-N,N-dibutylaminomethyl-3,4-dihydro-2H-pyran
2-N-methyl-N-phenylaminomethyl-3,4-dihydro-
    2H-pyran
2-piperidino-methyl-3,4-dihydro-2H-pyran and
2-morpholino-methyl-3,4-dihydro-2H-pyran The aldehydes of formyl compounds used as starting materials in the present process may be prepared as described in the art, for example, by dimerisation of acrolein or substituted acroleins and may contain small amounts of stabilising agents such as oxalic acid or ferric oxide.

The present process is conveniently carried out in a closed vessel pressured with hydrogen.

The process is normally carried out by charging the aldehyde, the catalyst and the ammonia, primary amine or secondary amine to a pressure vessel, pumping in hydrogen to a suitable pressure and then heating the pressure vessel, the contents being agitated by stirring or by rotation or rocking of the pressure vessel. The pressure vessel is so arranged that further hydrogen may be added as considered necessary.

Heating is continued until the pressure of hydrogen in the pressure vessel remains constant at a given temperature.

The pressure under which the process is carried out is the sum of the partial pressures exerted by the hydrogen and the ammonia, primary amine or secondary amine and any other volatile components.

The temperature and pressure at which the process is carried out may vary widely and in the presence of a specific amount of any one catalyst, these two features largely control the rate at which the reaction takes place.

The process is conveniently carried out under a partial pressure of hydrogen of from 10 to at least 300 atmospheres.

The rate at which the reaction takes place varies considerably with the temperature, the higher the temperature the more rapid the reaction and vice versa. The process may be carried out over a wide range of temperatures from about 80° C. to 250° C., but too high a temperature often leads to increased by-product formation. In order to obtain the best yield of the desired products consistent with a rapid rate of reaction it has been found desirable to carry out the reaction at a temperature of from 100° C. to 175° C., preferably from 110° C. to 160° C.

The process may be carried out in the presence of a solvent, examples of solvents which may be used include benzene and alkyl benzenes, tetrahydrofuran, cyclohexane and alcoholic solvents such as methyl alcohol, ethyl alcohol, propyl alcohol and butyl alcohol. Methyl alcohol in particuar has been found to be a valuable solvent and under certain conditions, for example, using low ammonia/or amine/aldehyde ratios has been found to lead to higher yields.

It is preferred to use an excess of ammonia, primary amine or secondary amine over that theoretically required.

When ammonia is used in the present process it has been found that the yield increases rapidly as the amount of ammonia is increased from one to, for example, six molar proportions of ammonia per mole of aldehyde. It is preferred to use more than 5 moles of ammonia per mole of aldehyde in the absence of a solvent. When a solvent of the alcoholic type, particularly methyl alcohol, is used it has been found that the amount of ammonia may be decreased, thus when methyl alcohol is used as solvent as little as 2 molar proportions of ammonia per mole of aldehyde may be used and a high yield of the desired product obtained. Higher proportions of ammonia may be used, for example up to 10 molar proportions per mole of aldehyde but the use of higher proportions than are necessary merely tends to be wasteful.

When primary or secondary amines are used in the present process it is found that even higher proportions of amine are useful in obtaining good yields of the desired product. Thus it is preferred to use from 5 to 20 molar proportions of amine per mole of aldehyde when the present process is carried out using a primary or secondary amine.

The catalyst used may be cobalt or nickel prepared by reduction of the corresponding metal oxide, the reduction is conveniently carried out by passing hydrogen over the metal oxide at a temperature of about 300° C. to 450° C. A particularly useful form of catalyst is obtained by sintering the metal oxide before reduction, sintering can be carried out at a temperature of from 600° C. to 1000° C. Catalysts sintered at higher temperatures, for example above 800° C. may require a hydrogen reduction temperature as high as 450° C. to obtain a convenient rate of reduction to metal.

The catalyst may be supported on one of the many known catalyst supports, for example, kieselguhr, silica, ceramics or sintered alumina.

Cobalt has been found to be a more efficient catalyst than nickel as less polymeric by-product is formed, cobalt is therefore a preferred catalyst.

In the case where a supported catalyst is used, cobalt in the form of an oxide precursor such as the hydroxide, carbonate or formate may be simultaneously calcined and reduced to the metal in one stage.

The same cobalt catalyst may be used for several consecutive reactions before showing signs of reduced activity. Used catalyst can be reactivated by heating in air at 400° C. and re-reducing.

The amount of catalyst used may vary considerably and will affect the rate of reaction. A sintered and reduced cobalt catalyst of low surface area may be used in an amount of about 10% on the weight of aldehyde whereas with a catalyst of higher surface area, 1% of catalyst may be satisfactory, especially if the catalyst is in powder form as for example in the case of cobalt metal on kieselguhr.

The process may be carried out by a batch or continuous process. In a continuous process for example, which is preferred on the large scale, a mixture of formyl compound, ammonia, primary or secondary amine and hydrogen flows through a tubular reactor packed with catalyst and is then subjected to a refining process.

The product whether made by a batch or continuous process may be purified by distillation after removal of the catalyst.

The aldehydes used as starting materials may be prepared as described in the art, for example by dimerisation of acrolein, methacrolein, or their homologues and may contain small amounts of stabilising agents such as oxalic acid or ferric oxide.

As a further modification of the present process it has been found that when using ammonia or a primary amine in the process of this invention it is possible to carry out the reaction in two stages. Thus it is possible to react the aldehyde with ammonia or a primary amine to give a Schiff's base and then to hydrogenate this product to give an amine of the present invention. In the case of ammonia the Schiff's base is formed as the trimer.

Thus as a modification of the present process there is provided a process for the manufacture of 2-aminomethyl-3,4-dihydro-2H-pyrans or N-monosubstituted derivatives thereof which comprises reacting an aldehyde of the general Formula I as hereinbefore defined with ammonia or a primary amine and hydrogenating the product in the presence as catalyst of cobalt or nickel produced by reduction of the corresponding metallic oxide.

As starting material for this modified process there may be used any compound of the general Formula I and ammonia or any primary amine.

The formation of the Schiff's base may be exemplified by the following equation:

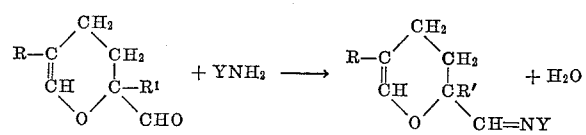

In the case of ammonia the Schiff's base is obtained in the form of a trimer, 2-iminomethyl-3,4-dihydro-2H-pyran trimer.

The formation of the Schiff's base may be carried out by heating the two reactants together in a suitable solvent such as benzene and removing the water formed, by a process of azeotropic distillation.

The second or hydrogenation stage of the modified process is carried out under the same conditions as the unmodified process.

The catalysts of the present invention, metallic cobalt or nickel produced by reduction of the corresponding metallic oxide have been found not only to be especially active but also particularly selective in their reduction of 2-formyl-3,4-dihydro-2H-pyran and derivatives in the presence of ammonia or amines. Thus they selectively promote aminative reduction of the formyl group without promoting reduction of the formyl group to an alcohol group and also promote aminative reduction without promoting reduction of the double bond of the pyran ring to any substantial extent.

The organic amines manufactured by the present process are useful as chemical intermediates for the production of compounds containing the dihydropyran ring and are valuable in chemical synthesis due to the presence of the unsaturated bond in the pyran ring.

In the case of products manufactured by the present process using ammonia or a primary amine, these products are of considerable value as intermediates in the manufacture of polymeric materials as they have a reactive amine group and a polymerisable and reactive unsaturated bond in the pyran ring.

Thus the 2-aminomethyl-3,4-dihydro-2H-pyrans in the form of their amine salts may be polymerised by polymerisation through the unsaturated bond in the pyran ring, under the influence of acid catalysts such as boron trifluoride, to give polymers useful as surface coatings and films.

As chemical intermediates, the 2-aminomethyl-3,4-dihydro-2H-pyrans containing at least one free hydrogen in the amine may be reacted with esters of acrylic or substituted acrylic acids to give substituted amides containing a vinyl group and a vinyl ether group, such substituted amides may be polymerised with known vinyl polymerisation catalysts to give polymers useful as surface coatings and films.

The invention is illustrated but is not limited by the following examples in which all parts and percentages are by weight—

Example 1

22 parts of cobalt oxide pellets (¼" by ¼"), sintered at 650° to 700° C. are reduced to cobalt metal by heating at 325° C. at atmospheric pressure in a stream of hydrogen diluted with an equal volume of nitrogen. The reduced catalyst is cooled to room temperature in the gas stream and then drowned in 200 parts of 2-formyl-3,4-dihydro-2H-pyran containing 0.05% oxalic acid as stabiliser, in an atmosphere of nitrogen.

The suspension of catalyst in 2-formyl-3,4-dihydro-2H-pyran is charged to a 2-litre stainless steel Bergius convertor, 200 parts of anhydrous ammonia is charged to the convertor and the convertor pressured with hydrogen to 150 atmospheres pressure at room temperature. The convertor is then rotated horizontally and heated to 130°–135° C. over 1 hour, during which time the pressure rises to about 230 atmospheres. Heating at 130°–135° C. is continued for 3 hours after which time the convertor is allowed to cool to room temperature and the excess hydrogen and ammonia blown off.

The catalyst is removed by filtration and there is obtained 182 parts of clear reddish brown liquid which is fractionally distilled at 2.5 to 3 mm. pressure of mercury through a 10" by 1" fractionating column packed with stainless steel gauze rings. On fractionation there is obtained 22 parts of fore-runnings, a main fraction of 133.5 parts boiling at 34° to 35° C. (uncorrected) at 2.5 to 2.7 mm. pressure and 11 parts of high boiling residue. A further 12.5 parts of impure main fraction (contaminated with residue) may be obtained by washing out the column and still head with acetone and evaporating the acetone.

The main fraction consisting of 2-aminomethyl-3,4-dihydro-2H-pyran is a colourless liquid with a strong ammoniacal odour.

Equivalent weight determined by titration with standard acid, 115.9 (theory 113).

Molecular weight calculated from iodine value, assuming one C=C link per molecule 117.5 (theory 113).

Examination in the mass spectrograph shows a parent peak at 113 consistent with the suggested structure.

Examination of the nuclear magnetic resonance spectrum shows six groups of proton resonances which are fully consistent with the suggested structure in position, splitting and area.

Examination of the infrared spectrum of the distilled product showed absorption peaks at 2.95 to 3.05 microns and 6.25 microns indicative of $NH_2$ groups, at 3.25 microns indicative of olefinic CH groups, at 6.10 microns indicative of C=C groups and at 9.4 indicative of ether groups.

All the above analytical and physical characteristics are fully consistent with the structure assigned to the product obtained in the example and defined hereinbefore.

Example 2

(A) Cobalt carbonate supported on kieselguhr is reduced to cobalt metal with hydrogen at 450 to 500° C. cooled to room temperature and drowned in tetrahydrofuran. 20 parts reduced catalyst (35 to 40% cobalt) in 100 parts tetrahydrofuran, 200 parts 2-formyl-3,4-dihydro-2H-pyran and 200 parts liquid ammonia are charged to a 2-litre stainless steel Bergius convertor which is then pressurised with hydrogen at room temperature to a total pressure of 150 atmospheres.

The convertor is rotated horizontally and heated to 130 to 135° C. over 1 hour. Heating is continued at 130 to 135° C. for 3 hours after which time the convertor is allowed to cool to room temperature and the excess unreacted hydrogen and ammonia blown off.

The catalyst is removed from the residual liquid product by filtration and the desired main product, 2-aminomethyl - 3,4-dihydro-2H-pyran, is isolated by fractional distillation (B.P. 36° C./3.3 mm. Hg) in 65% theory yield calculated on the acrolein dimer charged.

(B) The above used catalyst is heated in air at 750° C. for 4 hours and then reduced at atmospheric pressure at 325° C. in a stream of hydrogen diluted with an equal volume of nitrogen. The reduced cobalt metal-on-kieselguhr catalyst is cooled to room temperature in the gas stream and then drowned in tetrahydrofuran.

5 parts reduced catalyst in 50 parts tetrahydrofuran, 400 parts of acrolein dimer and 400 parts liquid ammonia are charged to a 4 litre stainless steel rocking autoclave which is then pressurised with hydrogen at room temperature to a total pressure of 150 atmospheres. The autoclave is isolated and the rocking motion started. The autoclave is heated to 130 to 135° C. over 1¼ hours and heating is continued at 130 to 135° C. for 6 hours after which the autoclave is allowed to cool to room temperature. The excess hydrogen and ammonia are then blown off.

The catalyst is removed from the residual liquid product by filtration and the desired main product, 2-aminomethyl - 3,4-dihydro-2H-pyran is isolated by fractional distillation in 80% theory yield calculated on the acrolein dimer charged.

This experiment illustrates the re-use of catalyst after regeneration.

Example 3

Following the conditions of the Example 1 but using only 100 parts of ammonia instead of 200 parts to 200 parts acrolein dimer, the isolated yield of 2-aminomethyl-3,4-dihydro-2H-pyran is only about 55% theory. If however 100 parts methanol are added to the converter charge the isolated yield of 2-aminomethyl-3,4-dihydro-2H-pyran is raised to 75% theory.

Example 4

Following the conditions of Example 1 but using only 60 parts ammonia to 200 parts acrolein dimer, the main product is trimeric 2-iminomethyl-3,4-dihydro-2H-pyran with a minor quantity of 2-aminomethyl-3,4-dihydro-2H-pyran. The same converter charge to which 200 parts methanol is added gives a 60% theory yield of 2-aminomethyl-3,4-dihydro-2H-pyran.

Example 5

17 parts of cobalt oxide pellets (¼" x ¼"), sintered at 650° C. to 700° C. for 4 hours, are reduced to cobalt metal by heating at 325° C. at atmospheric pressure in a stream of hydrogen diluted with an equal volume of nitrogen. The reduced catalyst is cooled to room temperature in the hydrogen gas stream and then drowned in 130 parts of 2-formyl-2,5-dimethyl-3,4-dihydro-2H-pyran containing a trace of hydroquinone.

The mixture of catalyst+2 - formyl-2,5-dimethyl-3,4-dihydro-2H-pyran is charged to a 2-litre stainless steel Bergius converter, 120 parts of anhydrous ammonia is charged to the convertor and the convertor pressurised with hydrogen to 150 atmospheres pressure at room temperature. The convertor is then rotated horizontally and heated to 130–135° C. over 1 hour, during which time the pressure rises to about 210 atmospheres. Heating at 130–135° C. is continued for 6 hours, after which time the convertor is allowed to cool to room temperature and the excess hydrogen and ammonia blown off. The reaction is apparently complete after 2 hours at 130–135° C.

The catalyst is removed by filtration and the liquid is fractionally distilled at 2 to 3 mm. pressure of mercury through a 10" by 1" fractionating column packed with stainless steel gause rings. The fraction boiling at 51° to 52° C. at 3 mm. pressure of mercury is 2-aminomethyl-2,5-dimethyl-3,4-dihydro-2H-pyran as shown by equivalent weight, unsaturation value by iodine titration, refractive index and infra-red examination. The isolated yield of 2 - aminomethyl-2,5-dimethyl-3,4-dihydro-2H-pyran is 91.5% and the total conversion yield is 95 to 96%. The product has the formula—

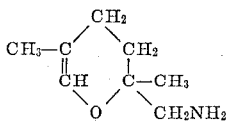

Example 6

Cobalt oxide pellets (e.g. ¼" x ¼") are sintered at 650–700° C. for 4 hours and then reduced to cobalt metal by heating at 300–350° C. at atmospheric pressure in a stream of hydrogen diluted with an equal volume of nitrogen. The reduced catalyst is cooled to room temperature in the gas stream and drowned in tetrahydrofuran.

10 parts of cobalt crystal prepared as above, 75 parts acrolein dimer containing ferric oxide as stabiliser and 327 parts n-butylamine are charged to a 2-litre stainless steel Bergius convertor and the convertor is pressurised with hydrogen to 150 atmospheres pressure at room temperature and then isolated. The convertor is then rotated horizontally and heated to 130 to 135° C. over 1 hour, during which time the pressure rises to about 200 atmospheres. Heating at 130 to 135° C. is continued for 3 hours after which time the convertor is allowed to cool to room temperature and the excess hydrogen pressure blown off.

The catalyst is removed by filtration and the reddish-brown clear liquid product is fractionally distilled, initially at atmospheric pressure to remove the unreacted excess butylamine, the pressure is then reduced in stages and the distillation is then finally completed at about 2 mm. pressure of mercury to obtain the major reaction product which is the 2-N-butylaminomethyl-3,4-dihydro-2H-pyran (confirmed by infra-red examination, equivalent weight and unsaturation measurements), B.P. 67° to 71° C. at about 1.8 mm. pressure, a colourless liquid.

Example 7

66 parts of acrolein dimer containing ferric oxide as stabiliser, 60 parts cyclohexylamine and 80 parts benzene are refluxed in a Dean and Stark apparatus to remove azeotropically with the benzene the water produced in the reaction of the acrolein dimer with the cyclohexylamine to form the Schiff's base. The product, still containing the major part of the benzene, is charged to a 2-litre stainless steel Bergius converter, together with 350 parts of cyclohexylamine and 10 parts cobalt catalyst prepared as in Example 6.

The convertor is pressurised with hydrogen to 150 atmospheres at room temperature and then rotated horizontally and heated to 130 to 135° C. over 35 minutes. Heating at 130 to 135° C. is continued for 7½ hours after which time the convertor is allowed to cool to room temperature and the excess hydrogen pressure blown off.

The catalyst is removed by filtration and the product is fractionally distilled, initially at 40 mm. to remove the unreacted excess cyclohexylamine. The pressure is then reduced to about 2 mm. pressure of mercury to obtain the major reaction product which is the 2-N-cyclohexyl-aminomethyl-3,4-dihydro-2H-pyran (confirmed by infra-red examination and equivalent weight and unsaturation measurements), B.P. 84–90° C. at about 2 mm. pressure, a colourless liquid.

Example 8

(A) Gaseous dimethylamine is passed into a stirred flask containing 180 parts acrolein dimer (stabilised with ferric oxide) until 290 parts dimethylamine have been condensed, the flask being cooled in a methanol bath maintained at about −30° C. by periodic addition of solid carbon dioxide. The contents of the flask are charged to a precooled 2-litre stainless steel Bergius convertor and 20 parts cobalt catalyst prepared as in Example 6 are added. The convertor is then pressured with hydrogen to 150 atmospheres pressure.

The convertor is rotated horizontally and heated to 130 to 135° C. over 1 hour during which time the pressure rises to about 237 atmospheres. Heating is continued at 130 to 135° C. for 3½ hours after which time the convertor is allowed to cool to room temperature and the excess hydrogen together with a large part of the excess dimethylamine is blown off.

The catalyst is removed from the liquid product by filtration and the desired main product, 2-N,N-dimethyl-aminomethyl-3,4-dihydro-2H-pyran, is isolated by fractional distillation at about 15 mm. pressure of mercury. The structure of the product is confirmed by infrared examination, equivalent weight and unsaturation measurements.

The product is a colourless liquid having a B.P. of 62°–63° C. at 15 mm. pressure of Hg.

(B) In a similar Bergius convertor experiment in which a mixture of 500 parts dimethylamine, 100 parts acrolein dimer and 10 parts of cobalt catalyst, pressurised at room temperature with hydrogen at 150 atmospheres pressure, is reacted for 7 hours at 130° C., the isolated yield of 2-N,N-dimethylaminomethyl - 3,4 - dihydro-2H-pyran is 75% theory (calculated on the acrolein dimer charged) with a total estimated conversion yield of at least 90%.

Example 9

179 parts liquid methylamine at a temperature below −30° C. is charged to a 2-litre stainless steel Bergius convertor precooled to below −20° C. 15 parts reduced cobalt catalyst made as described in Example 5, and 122 parts 2-formyl-2,5-dimethyl-3,4-dihydro-2H-pyran (methacrolein dimer), likewise precooled below −20° C. are next charged to the convertor, which is then sealed and pressured with hydrogen to about 150 atmospheres pressure.

The convertor is rotated horizontally and heated to 130 to 135° C. over 1 hour. Heating is continued at 130–135° C. for 6 hours after which time the convertor is allowed to cool to room temperature and the excess hydrogen together with a large part of the excess methylamine is blown off.

The catalyst is removed from the residual liquid product by filtration and the desired main product, 2-N-methyl-aminomethyl-2,5-dimethyl-3,4-dihydro-2H-pyran is isolated by fractional distillation in 60% theory yield (calculated on original charge of methacrolein dimer) as a colourless liquid having a B.P. (uncorrected) of about 65° C. at 7 mm. pressure of Hg. The structure of the product is confirmed by infrared and nuclear magnetic resonance examination, equivalent weight and unsaturation measurements.

Example 10

A mixture of 15 parts reduced cobalt pellets prepared as in Example 5 and 139 parts 2-formyl-2,5-dimethyl-3,4-dihydro-2H-pyran (methacrolein dimer) is charged to a 2-litre stainless steel Bergius convertor both the charge and the convertor having been precooled below −10° C. 500 parts liquid dimethylamine at a temperature of about −10° C. is then charged and the convertor is sealed and pressurised with hydrogen to 150 atmospheres pressure.

The convertor is rotated horizontally and heated to 130–135° C. over 1 hour. Heating is continued at 130 to 135° C. for 6½ hours after which time the convertor is allowed to cool to room temperature and the excess hydrogen together with a large part of the excess dimethylamine is blown off.

The catalyst is removed by filtration from the residual liquid product and the latter is fractionally distilled. The desired product, 2 - N,N - dimethylaminomethyl-2,5-dimethyl-3,4-dihydro-2H-pyran is obtained as a fraction (contaminated with a little 2-hydroxymethyl-2,5-dimethyl-3,4-dihydro-2H-pyran) boiling at 71° C./23 mm. Hg. Infrared and nuclear magnetic resonance examination confirms the structure of the product.

Example 11

10 parts of cobalt catalyst, prepared by reduction of sintered cobalt oxide pellets as described in Example 1, are drowned in pyrrolidine, 112 parts acrolein dimer containing ferric oxide as stabiliser and 466 parts pyrrolidine are charged to a 2-litre stainless steel Bergius convertor and the convertor is pressurised with hydrogen to 150 atmospheres pressure at room temperature. The convertor is rotated horizontally and heated to 130 to 135° C. over 1 hour during which time the pressure rises to about 200 atmospheres. Heating at 130 to 135° C. is continued for 6 hours after which time the convertor is allowed to cool to room temperature and the excess hydrogen pressure released.

The catalyst is removed by filtration and the residual liquid product is fractionally distilled, initially at atmospheric pressure to remove the unreacted excess pyrrolidine. The pressure is then reduced in stages and the distillation is finally completed at about 3 mm. pressure of mercury to obtain the major reaction product which is the 2-N-pyrrolidinomethyl-3,4-dihydro-2H-pyran (confirmed by infrared and nuclear magnetic resonance examination), a colourless liquid with a B.P. 75° C./3.1 mm. (uncorrected) the isolated yield of this dihydropyran derivative is 62% calculated on the acrolein dimer charged though the true conversion yield is considerably higher.

Example 12

10 parts cobalt catalyst pellets (prepared and reduced as in Example 1, drowned in tetrahydrofuran), 100 parts 2 - iminomethyl-3,4-dihydro-2H-pyran timer, and 200 parts tetrahydrofuran are charged to a 2-litre stainless steel Bergius convertor which is then closed; 86 parts liquid ammonia are then charged to the converter followed by hydrogen to raise the total pressure to 150 atmospheres pressure at room temperature.

The convertor is rotated horizontally and heated to 130 to 135° C. over 1 hour. Heating is continued at 130 to 135° C. for 6 hours after which time the convertor is allowed to cool to room temperature and the excess unused hydrogen and ammonia are then blown off.

The catalyst is removed from the residual liquid product by filtration and the desired main product, 2-aminomethyl-3,4-dihydro-2H-pyran, is isolated by fractional distillation in 80% theory yield (calculated on the original charge of 2-iminomethyl-3,4-dihydro-2H-pyran trimer).

Example 13

360 parts liquid methylamine at a temperature below −30° C. is charged to a 2-litre stainless steel Bergius convertor precooled to below −20° C. 15 parts reduced cobalt catalyst made as described in Example 1, and 200 parts 2-formyl-3,4-dihydro-2H-pyran (acrolein dimer), likewise precooled below −20° C. are next charged to the convertor, which is then sealed and pressurised with hydrogen to about 150 atmospheres pressure.

The converter is rotated horizontally and heated to 130 to 135° C. over 40 minutes. Heating is continued at 130 to 135° C. for 6 hours after which time the converter is allowed to cool to room temperature and the excess hydrogen together with a large part of the excess methylamine is blown off.

The catalyst is removed from the residual liquid product by filtration and the desired main product, 2-N-methylaminomethyl-3,4-dihydro-2H-pyran, is isolated by fractional distillation in 77% theory yield (calculated on original charge of acrolein dimer) as a colourless liquid having a B.P. (uncorrected) of 45 to 48° C. at about 6 mm. pressure of mercury. The structure of the compound is confirmed by infrared and nuclear magnetic resonance examination, equivalent weight and unsaturated measurements.

Example 14

10 parts of cobalt catalyst, prepared by reduction of sintered cobalt oxide pellets as described in Example 1 and drowned in morpholine, 112 parts acrolein dimer containing ferric oxide as stabiliser and 570 parts morpholine are charged to a 2-litre stainless steel Bergius converter and the converter is pressurized with hydrogen to 175 atmospheres pressure at room temperature. The converter is rotated horizontally and heated to 130 to 135° C. over 1½ hours during which time the pressure rises to about 210 atmospheres. Heating at 130 to 135° C. is continued for 6 hours after which time the converter is allowed to cool to room temperature and the excess hydrogen pressure released.

The catalyst is removed by filtration and the residual liquid product is fractionally distilled under reduced pressure. The main reaction product, which is 2-morpholinomethyl-3,4-dihydro-2H-pyran, is obtained as a clear pale yellow liquid with a B.P. 87–92° C./1.7–2 mm. (uncorrected). The isolated yield of this dihydropyran derivative is 63% calculated on the acrolein dimer charged and its structure is confirmed by infrared and nuclear magnetic resonance examination.

Example 15

112 parts of acrolein dimer, 85 parts piperidine and 88 parts benzene are refluxed in a Dean and Stark apparatus to remove azeotropically with the benzene the water produced in the condensation reaction of the acrolein dimer with the piperidine. The product, still containing the major part of the benzene is charged to a 4-litre stainless steel rocking autoclave, together with 647 parts piperidine and 10 parts cobalt catalyst prepared as in Example 6.

The autoclave is pressurised with hydrogen to 150 atmospheres at room temperature, then set in motion and heated at 135° C. over about 1 hour. Heating at 135° C. is continued for 15 hours after which time the autoclave is allowed to cool to room temperature and the excess hydrogen pressure blown off.

The catalyst is removed from the product by filtration and the filtrate is fractionally distilled under reduced pressure. The fraction boiling at 60 to 67° C. at 0.4 to 0.6 mm. mercury pressure (uncorrected) is the 2-piperidinomethyl-3,4-dihydro-2H-pyran, the structure of which is confirmed by infrared and nuclear magnetic resonance examination as well as by chemical analysis. The isolated yield of 2-piperidinomethyl-3,4-dihydro-2H-pyran is 33% but the total conversion yield of this product is much higher, much of it being left in the still boiler to avoid contamination of the distilled fraction.

Example 16

A sintered nickel catalyst is prepared in like manner to that described for the cobalt catalyst in Example 1. 20 parts of the freshly reduced catalyst are drowned in 200 parts of acrolein dimer containing ferric oxide as stabiliser.

The above mixture of acrolein dimer and catalyst is charged to a 2-litre stainless steel Bergius converter, 200 parts of anhydrous ammonia are added and the converter pressurised to 150 atmospheres at room temperature. The converter is then rotated horizonally and is heated to 130 to 135° C. over 1 hour. Heating at 130 to 135° C. is continued for 6 hours after which the time converter is allowed to cool to room temperature and the excess hydrogen and ammonia are then blown off.

The catalyst is removed from the liquid product by filtration and the filtrate fractionally distilled under reduced pressure. A 15% isolated yield of pure 2-aminomethyl-3,4-dihydro-2H-pyran is obtained as a fraction boiling at 32 to 40° C. at 2.5 to 4 mm. mercury pressure (uncorrected) with a total conversion yield of about 25%. The residual product is polymeric material probably having a polyacetal structure.

Example 17

20 parts of a nickel-on-kieselguhr catalyst (approximately 33% Ni, 67% kieselguhr), pre-reduced with hydrogen at 400° C., are suspended in 200 parts acrolein dimer. This suspension is charged to a 2-litre Bergius converter, 200 parts of anhydrous ammonia is added and the converter pressurised with hydrogen to 150 atmospheres at room temperature.

The converter is then rotated horizontally and is heated to 130° C. over 50 minutes. Heating is continued at 130° C. for 3 hours after which time the converter is allowed to cool to room temperature and the excess hydrogen and ammonia are then blown off.

The catalyst is removed from the liquid product by filtration and the filtrate is fractionally distilled under reduced pressure. A 40% isolated yield of pure 2-aminomethyl-3,4-dihydro-2H-pyran is obtained as a fraction boiling at 31 to 32° C. at about 2.5 mm. mercury pressure (uncorrected), the overall conversion yield being about 50%. The residual product is polymeric material.

Example 18

A mixture of 10 parts pre-reduced cobalt catalyst pellets, prepared as in Example 5, 112 parts 2-formyl-3,4-dihydro-2H-pyran (acrolein dimer) containing ferric oxide as stabiliser and 695 parts benzylamine are charged to a 2-litre stainless steel Bergius converter and the converter is then pressurised with hydrogen to 150 atmospheres at room temperature. The converter is rotated horizontally and heated to 130 to 135° C. over about 40 minutes. Heating at 130 to 135° C. is continued for 6 hours after which time the converter is allowed to cool and the excess hydrogen released.

The catalyst is removed by filtration and the liquid product fractionally distilled, the initial pressure of 40 mm. mercury pressure being reduced in stages to about 1 mm. mercury. The yield of 2-benzylaminomethyl-3,4-dihydro-2H-pyran (calculated on the acrolein dimer charged) is 26%. This is a pale yellow liquid having a B.P. of 107° C. at about 0.75 mm. mercury pressure. The structure is confirmed by chemical analysis and nuclear magnetic resonance examination.

The reaction product also contained 23% yield (calculated on the acrolein dimer charged) of the unreduced 2-benzyliminomethyl-3,4-dihydro-2H-pyran. Hydrogenation of this to the above 2-benzyl-iminomethyl-3,4-dihydro-2H-pyran is achieved by suitably prolonging the reaction time at 130 to 135° C.

What is claimed is:

1. A process for the manufacture of 2-aminomethyl-3,4-dihydro-2H-pyran which comprises reacting 2-formyl-3,4-dihydro-2H-pyran with hydrogen in the presence of ammonia and in the presence as catalyst of a metal selected from the group consisting of metallic cobalt or nickel produced by reducing the corresponding metallic oxide.

2. The process of claim 1 wherein the reaction is carried out under a partial pressure of hydrogen of from 10 to 300 atmospheres of hydrogen.

3. The process of claim 1 wherein the reaction is carried out at a temperature of from 100° C. to 175° C.

4. The process of claim 1 wherein the process is carried out in the presence of an alcoholic solvent.

5. The process of claim 1 wherein the catalyst is metallic cobalt produced by reducing cobalt oxide.

6. The process of claim 5 wherein the metallic cobalt catalyst is produced by sintering cobalt oxide at a temperature of from 600 to 1000° C. and reducing the resulting sintered cobalt oxide at a temperature of from 300 to 350° C.

References Cited

UNITED STATES PATENTS 3,198,808   10/1962   Himmele et al. _____ 260—326.5

NICHOLAS S. RIZZO, *Primary Examiner.*

JOSE TOVAR, *Examiner.*